(12) United States Patent
Lewis et al.

(10) Patent No.: US 10,823,267 B2
(45) Date of Patent: Nov. 3, 2020

(54) PRESS FIT OR CLINCH STUD RETENTION SUPPORT FEATURE WITHOUT WELDING

(71) Applicant: SCHAEFFLER TECHNOLOGIES AG & CO. KG, Herzogenaurach (DE)

(72) Inventors: David Lewis, Lexington, OH (US); Keith Spore, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 49 days.

(21) Appl. No.: 15/992,805

(22) Filed: May 30, 2018

(65) Prior Publication Data
US 2019/0368589 A1    Dec. 5, 2019

(51) Int. Cl.
*F16H 41/28*    (2006.01)
(52) U.S. Cl.
CPC ..................... *F16H 41/28* (2013.01)
(58) Field of Classification Search
CPC . F16H 41/28; F16D 1/076; F16D 3/79; Y10T 403/1691
See application file for complete search history.

(56) References Cited

U.S. PATENT DOCUMENTS

| 2,858,681 A * | 11/1958 | Smirl | F16D 3/06 464/69 |
| 6,216,837 B1 * | 4/2001 | Maienschein | F16H 41/24 192/200 |
| 8,210,752 B2 * | 7/2012 | Kamikawa | F16C 33/768 384/544 |
| 8,439,764 B2 | 5/2013 | Avins | |
| 9,360,097 B2 | 6/2016 | Burky, Jr. | |
| 2007/0149295 A1 | 6/2007 | Farahati et al. | |

* cited by examiner

*Primary Examiner* — F Daniel Lopez
(74) *Attorney, Agent, or Firm* — Brooks Kushman P.C.

(57) ABSTRACT

A torque converter drive plate, comprising a drive stud that includes a head, and a drive plate that includes a single continuous layer of material extending from a front of the drive plate, around a radial surface of the drive plate, and to a back of the drive plate, wherein the drive stud is secured into a hole of the drive plate, wherein the back of the drive plate covers the head and is in contact with a surface of the head.

17 Claims, 4 Drawing Sheets

PRESS FIT OR CLINCH STUD RETENTION SUPPORT FEATURE WITHOUT WELDING

TECHNICAL FIELD

The present disclosure relates to a torque converter drive plate, including a drive stud utilized in a torque converter drive plate.

BACKGROUND

A torque converter drive plate may utilize spot welding to clinch studs to the drive plate. Tack welding of the drive studs into holes of the drive plates of the torque converter may be utilized to reduce the risk of the clinch between the drive stud and the drive plate breaking free. Such welding may be costly and time consuming from a manufacturing standpoint.

SUMMARY

According to one embodiment, a torque converter drive plate, includes a drive stud that includes a head, and a drive plate that includes a single continuous layer of metal extending from a front of the drive plate, around a radial surface of the drive plate, and to a back of the drive plate, wherein the drive stud is secured into a hole of the drive plate, wherein the back of the drive plate covers the head and is contact with a surface of the head.

According to a second embodiment, a torque converter drive plate, includes a drive stud that includes a head and a shaft section, and a drive plate that includes a hole and a folded-flange portion, wherein the drive stud is secured into the hole, wherein the folded-flange portion includes a back surface of the drive plate that covers the head to define a gap defined by a top surface of the head and the back surface of the drive plate.

A third embodiment discloses a method of securing a fastener into a drive plate of a torque converter that includes forming a drive plate with a flange extending away from a drive plate plane that includes a hole, pressing the fastener into the hole of the drive plate, wherein the fastener includes a head portion, and pressing the flange of the drive plate to cover the head portion of the fastener.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A torque converter drive plate retention may utilize spot welding to clinch one or more studs to the drive plate. The decision to tack weld drive studs into the drive plates of torque converters is done to reduce the risk of the clinch between the drive stud and the drive plate breaking free, which may occur. Such welding may be costly and time consuming from a manufacturing standpoint. It may be beneficial to utilize the material (e.g. steel) from the drive plate itself to reinforce the drive studs. Because the studs are inserted into the drive plate during the stamping press, the stamping press may be utilized as the manufacturing location to accomplish such reinforcement by utilizing the drive plate itself. Such a process may achieve cost savings.

Figure 1:
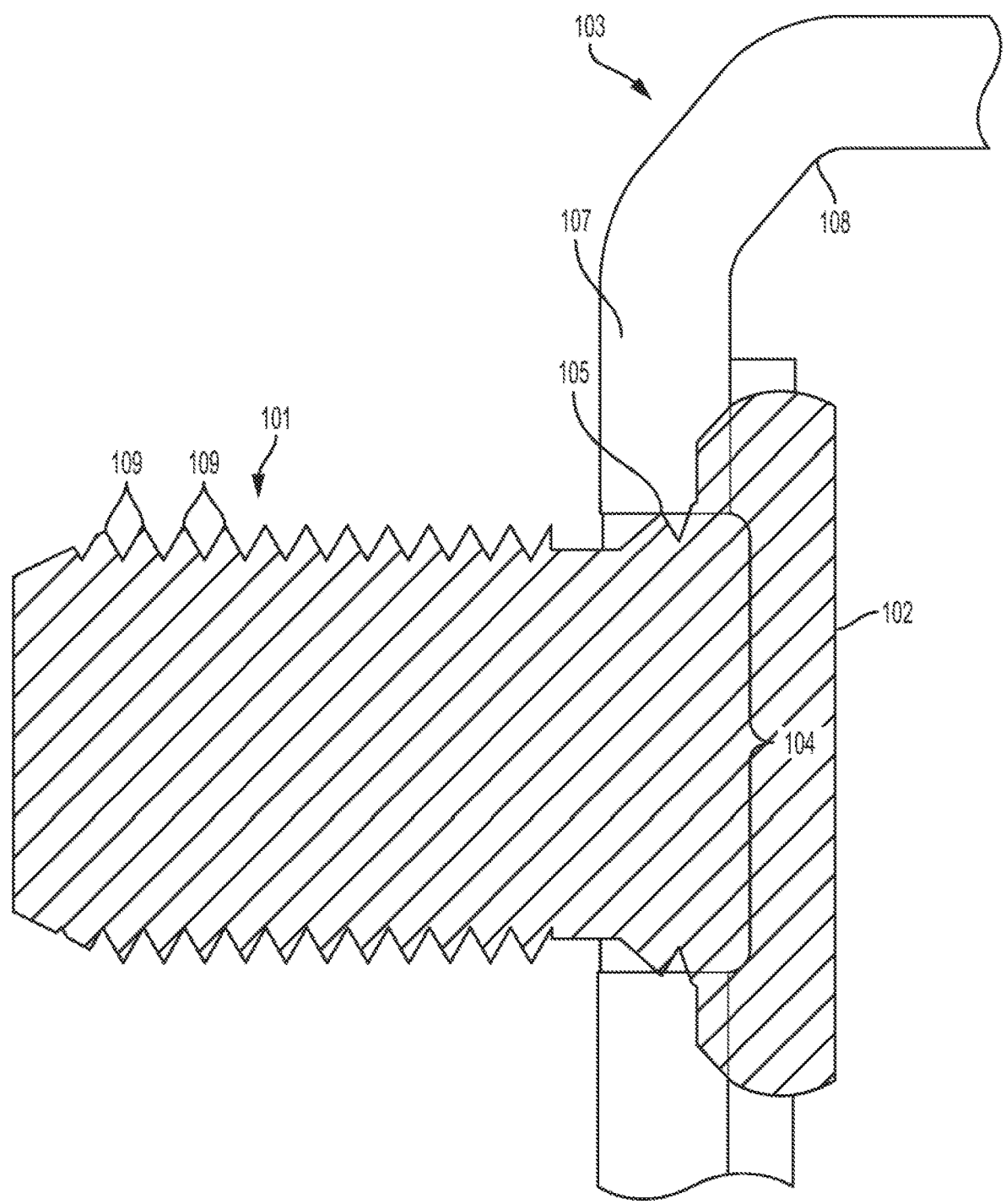
FIG. 1 is an embodiment of a drive plate stud with an outwardly extending flange portion.

FIG. 1 is an example of a drive plate stud with an outwardly extending flange portion 108. A drive stud 101 may be pressed into a hole 104 of the drive plate 103 of a torque converter. The drive stud 101 may be pressed and clinched into a hole 104 of the drive plate plane utilizing a clinch feature 105 of the drive stud 101. The clinch feature 105 may form a press fit/interference fit between a shaft section of the drive stud 101 and the hole 104 of the drive plate plane 107. Additionally, an interference fit may be formed by the clinch feature 105 and one or more teeth found along a shaft section of the drive stud 101. However, embodiments may not include such a clinch feature that utilizes one or more teeth 109 of the drive stud 101. For example, an interference fit may be formed when a diameter of the shaft section of the drive stud 101 exceeds the diameter of the hole 104 found on the drive plate plane 107. The drive stud 101 and drive plate plane 107 may be formed from steel.

The drive stud 101 may include a shaft section and a head 102. The head 102 may be utilized to prevent the drive stud 101 from being forced through the hole 104 of the torque converter drive plate plane 107. Because there is a risk that the torque converter's drive plates clinch may break free, a typical drive plate plane may require welding of the drive studs 101 to secure the torque converter drive plate 103. However, there are high costs associated with welding.

Figure 2:
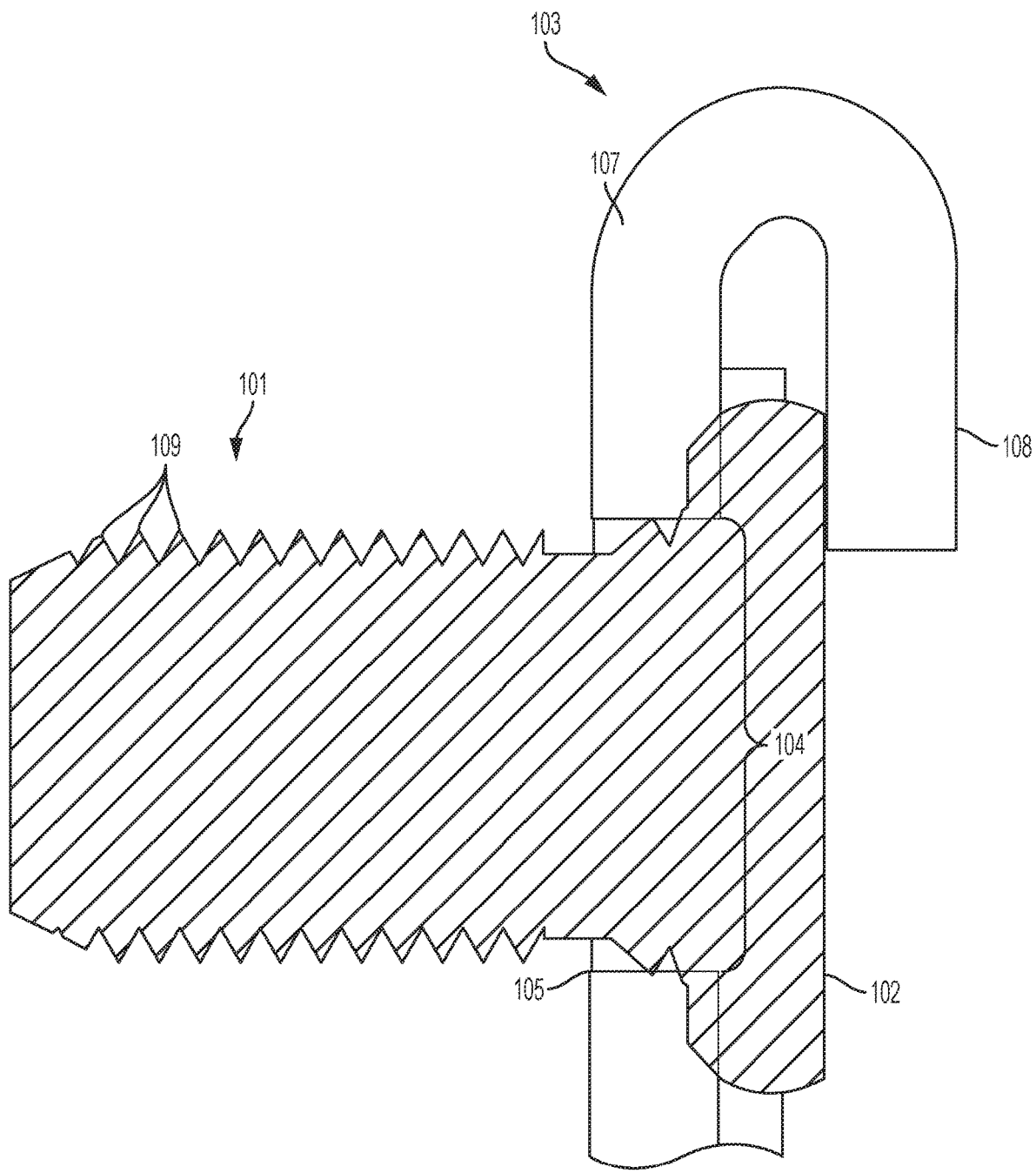
FIG. 2 is an embodiment of a drive plate stud with a folded-over flange portion.

FIG. 2 is an example of a drive plate stud 101 with a folded-over flange portion 108. The drive plate 103 may be a single continuous layer of metal extending from the front, around a radial surface, and to the back to cover a portion of the drive stud 101. During the machining or assembly process, the flange portion 108 may be pressed to fold over and cover a portion of the drive stud 101. Due to the pressing of the flange 108, the back portion of the flange 108 of the drive plate 103 may cover the drive stud 101. The same station that presses the drive stud 101 into the drive plate plane 107 may be utilized to fold the flange portion 108 over. However, a different station may also be utilized. The stations, for example, may be a stamping press or any other type of metal-working machine that may shape, cut, or deform metal.

The folded flange portion 108 of the torque converter drive plate plane 107 can act as an extra resistance or support for the drive stud 101 that may reduce loosening of the clinch of the stud. In one embodiment, the flange portion 108 may be folded over to contact a top surface of a head 102 of the drive stud 101. In such an embodiment, the contact of the flange portion 108 of the drive plate 103 may cover any amount of surface area of the head 102 of the drive stud 101. In one example, the flange portion 108 that is folded over the drive stud 101 may cover at least 50% of a surface area of the head 102. In another example, the flange portion 108 that is folded over the drive stud 101 may cover less than 50% of a surface area of the head 102. In one example, the flange portion 108 that is folded over the drive stud 101 may cover at least 75% of a surface area of the head 102. In another example, the flange portion 108 that is folded over the drive stud 101 may cover less than 25% of a surface area of the head 102. Covering of the surface area of the head 102 may include physical contact of a surface of the drive plate 103 with a surface of the head 102, or may include a gap that is defined between a top surface of the head 102 and a back surface of the drive plate 103. If the drive stud 101 becomes loose, the head 102 may move axially through the gap towards the folded-over flange 108 section. The back surface of the flange 108 would prevent the drive stud 101 from becoming loose to the point the drive stud 101 would fall out, as it would stop the axial forces moving away from the hole 104 towards the folded-over flange 108. Without the fold-over flange 108, the drive stud 101 may loosen and fall out. Thus, the covering of the head 102 by the folded-over flange portion 108 may prevent axial movement of the drive stud 101 away from the hole 104 and the drive stud 103 from falling out.

Figure 3:
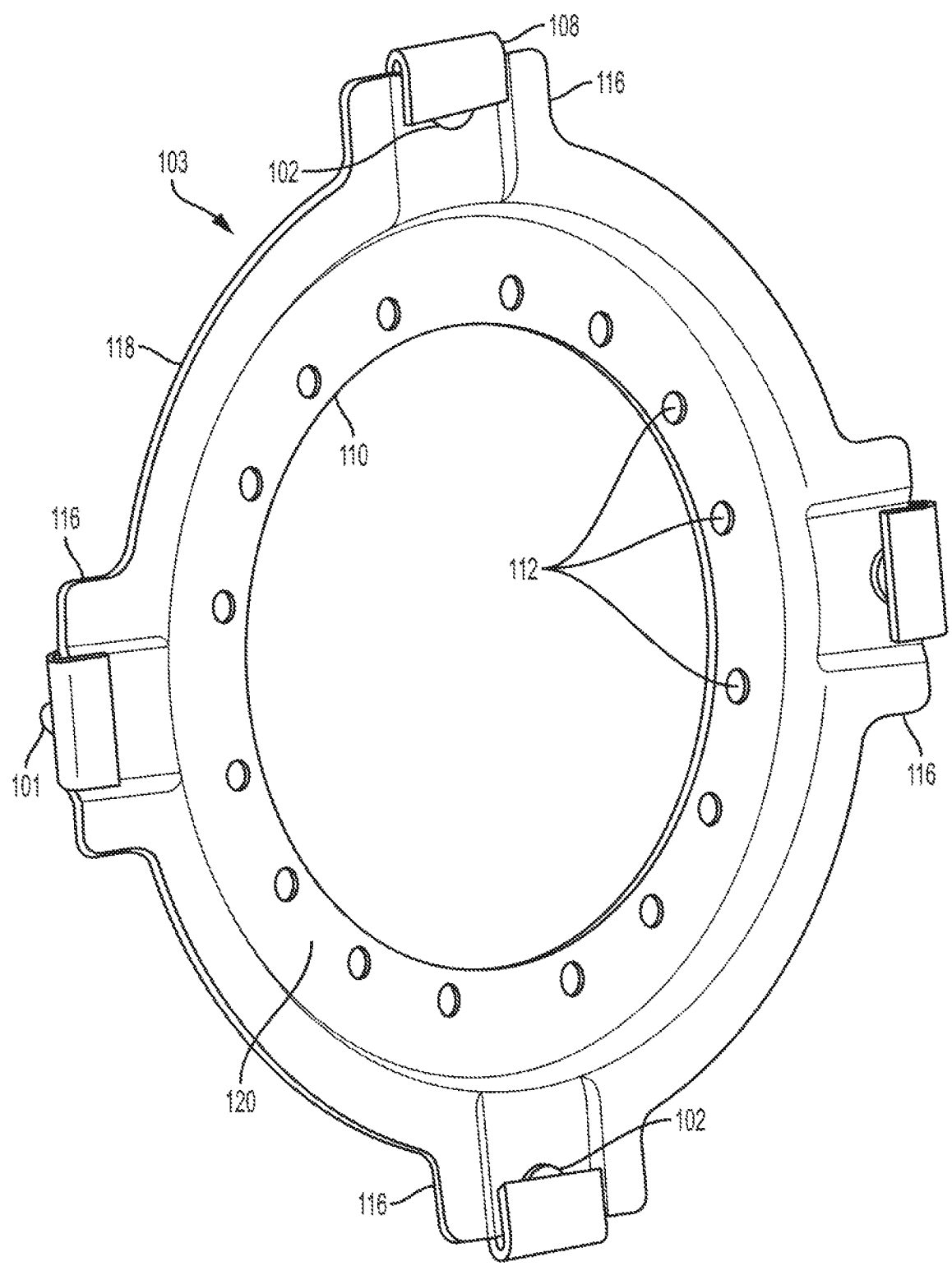
FIG. 3 is a rear perspective view of drive plate according to an embodiment.
Figures 4, 5:
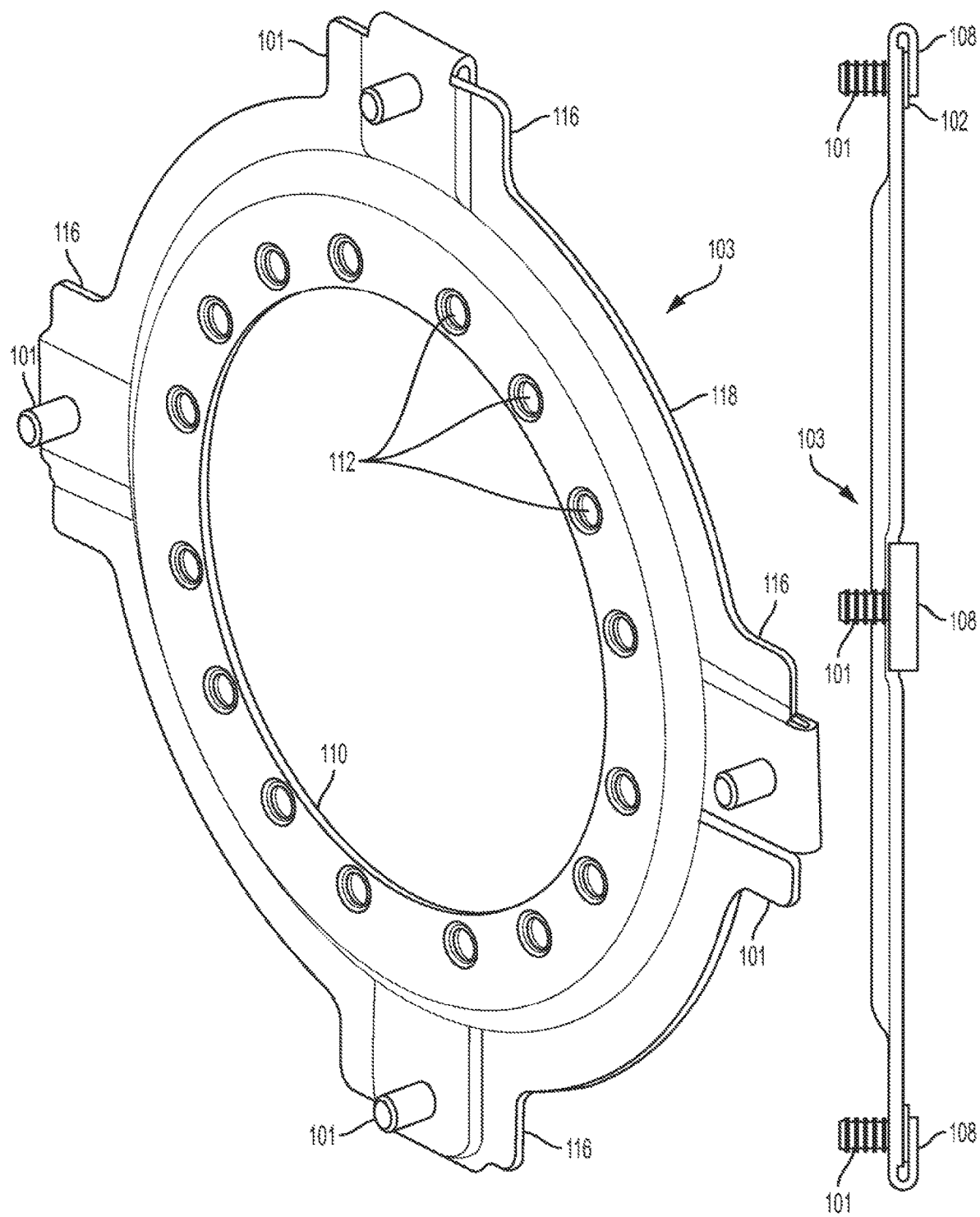
FIG. 4 is a front perspective view of a drive plate according to an embodiment.
FIG. 5 is a side view of a drive plate according to an embodiment.

FIG. 3 is a rear perspective view of drive plate 103, whereas FIG. 4 is a front perspective view of drive plate 103. Drive plate 103 may be arranged for connection to a front cover of a torque converter. The drive plate 103 may include an annular shaped inner portion 120 including an inner periphery 110 for the drive plate 103 and a plurality of openings 112 for receiving fasteners for connection to a front cover of a torque converter. Fasteners can be any fasteners known in the art. In one embodiment, fasteners may be extruded rivets. The drive plate 103 may also include a plurality of outer portions 116 along an outer periphery 118 for the drive plate 103. Surfaces of the drive tab may extend from the top surface and may be substantially parallel to an axis along a center of the drive plate that extends out radially away from the center.

FIG. 5 is a side view of a drive plate 103. The drive plate may include an opening or hole for receiving fastener/drive stud 101 for connecting the drive plate 103 to a flex plate. In one embodiment, the drive plate includes female threaded fasteners for receiving a male fastener that is utilized for the opening/hole 112. Fasteners can be any applicable fasteners known in the art. In one embodiment, fasteners are lugs. The folded-over flange portion 108 may cover a head of the drive stud 101. The folded-over flange portion 108 may be in contact with the top surface of the head 102 of the drive stud 101 or may leave a gap between the top surface of the drive stud 101 and a back-surface of the folded-over flange portion 108. In an instance when the fold-over flange portion 108 has a gap between the back-surface of the folded over flange portion and the top surface of a head 102 of the drive stud 101, the folded-over flange portion 108 may prevent an axial movement and/or displacement of the drive stud away from the hole when the gap is eliminated and the top surface of the head 102 becomes in contact with the folded-over flange portion 108.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating to a certain term that is both illustrated in the Figures and present in the claims is not intended to limit the claims to only cover the illustrated embodiment.

LIST OF REFERENCE NUMBERS

101 Drive Stud
102 Head
103 Drive Plate
104 Hole
105 Clinch Feature
107 Drive Plate Plane
108 Flange
109 Teeth
110 Inner Periphery
112 Openings
116 Outer Portion
118 Outer Periphery
120 Inner Portion

What is claimed is:

1. A torque converter drive plate, comprising:
a drive stud that includes a head, wherein the torque converter drive plate includes:
an annular disk portion that includes a single continuous layer of material, wherein the annular disk portion includes a front surface and a back surface and a hole, wherein the drive stud is secured into the hole; and
a flange portion integral to the annular disk portion and extending out of an outer periphery of the annular disk portion, wherein a portion of the flange portion covers the hole and the head, wherein the flange portion is in contact with a top surface of the head.

2. The torque converter drive plate of claim 1, wherein the torque converter drive plate includes an annular shaped inner portion that includes an inner periphery and a plurality of openings for receiving fasteners for connection to a front cover of a torque converter.

3. The torque converter drive plate of claim 1, wherein the portion of the flange portion covers at least 50% of a top surface area of the head.

4. The torque converter drive plate of claim 1, wherein the portion of the flange portion covers less than 50% of a top surface area of the head.

5. The torque converter drive plate of claim 1, wherein the drive stud is secured into the hole utilizing an interference fit.

6. The torque converter drive plate of claim 1, wherein the drive stud includes a shaft including a plurality of teeth.

7. The torque converter drive plate of claim 1, wherein the drive stud is made of steel.

8. A torque converter drive plate, comprising:
a drive stud that includes a head and a shaft section;
and an annular disk portion includes a hole and a folded-flange portion and the drive stud is secured into the hole, wherein the annular disk portion includes a front surface and a back surface, wherein the annular disk portion is defined by an outer periphery and an inner periphery, and wherein the folded-flange portion is integral to the annular disk portion and covers the hole and the head such that a gap is defined therebetween by a top surface of the head and the folded-flange portion.

9. The torque converter drive plate of claim 8, wherein the folded-flange portion is configured to prevent axial movement of the drive stud away from the hole when the gap is eliminated and the top surface of the head becomes in contact with the back surface.

10. The torque converter drive plate of claim 8, wherein the folded-flange portion is formed from bending a flange of the annular disk portion.

11. The torque converter drive plate of claim 8, wherein the torque converter drive plate includes a plurality of openings proximate and surrounding the inner periphery, wherein the plurality of openings are configured to receive fasteners for connection to a front cover of a torque converter.

12. The torque converter drive plate of claim 8, wherein the drive stud is secured into the hole utilizing an interference fit.

13. The torque converter drive plate of claim 8 wherein the folded-flange portion covers at least 50% of a surface area of the head.

14. The torque converter drive plate of claim 8, wherein the folded-flange portion covers less than 50% of a surface area of the head.

15. A torque converter drive plate, comprising:
an annular disk portion that includes a front surface and a back surface, wherein the annular disk portion is defined by an outer periphery and an inner periphery, and an annular opening is defined by the inner periphery;
one or more holes within the annular disk portion, wherein each of the one or more holes are adapted to receive a drive stud; and
one or more flange portions integrally extending from the outer periphery of the annular disk portion and folding over the back surface, wherein each of the one or more flange portions is covering at a respective one of the one or more holes.

16. The torque converter drive plate of claim 15, wherein the flange portion extends from the outer periphery.

17. The torque converter drive plate of claim 15, wherein the flange portion is further in contact with a top surface of a head upon the drive stud being inserted in the hole.

* * * * *